(12) United States Patent
Lee

(10) Patent No.: US 11,427,073 B2
(45) Date of Patent: Aug. 30, 2022

(54) DIESEL EXHAUST FLUID CAP ASSEMBLY FOR VEHICLE AND DIESEL EXHAUST FLUID SUPPLY SYSTEM INCLUDING THE SAME

(71) Applicants: HYUNDAI MOTOR COMPANY, Seoul (KR); KIA MOTORS CORPORATION, Seoul (KR)

(72) Inventor: Tae Yoon Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 41 days.

(21) Appl. No.: 17/152,271

(22) Filed: Jan. 19, 2021

(65) Prior Publication Data
US 2022/0041051 A1  Feb. 10, 2022

(30) Foreign Application Priority Data
Aug. 4, 2020  (KR) .......................... 10-2020-0097483

(51) Int. Cl.
*B60K 15/04*  (2006.01)
(52) U.S. Cl.
CPC .. *B60K 15/0406* (2013.01); *B60K 2015/0451* (2013.01)
(58) Field of Classification Search
CPC . B67C 2011/20; B67C 2011/30; B67C 11/02; B60K 2015/0451
See application file for complete search history.

(56) References Cited

U.S. PATENT DOCUMENTS

| 5,195,567 | A  | * | 3/1993  | Tyree, Jr. ................ | B67C 11/02 141/297 |
| 5,921,296 | A  | * | 7/1999  | Porter ..................... | B67C 11/02 141/331 |
| 6,425,424 | B1 | * | 7/2002  | Ellis Calvo ............. | B67C 11/02 141/331 |
| 7,886,782 | B1 | * | 2/2011  | Curtis .................... | B65D 51/245 141/340 |
| 8,875,754 | B2 | * | 11/2014 | Eyre ...................... | B67C 11/00 141/338 |
| 2003/0106609 | A1 | * | 6/2003  | Leoncavallo .......... | B67C 11/02 141/340 |
| 2015/0321892 | A1 | * | 11/2015 | Liu ....................... | B67C 11/063 141/335 |
| 2016/0052768 | A1 | * | 2/2016  | Schmidt ................. | B67C 11/02 141/337 |
| 2016/0130042 | A1 | * | 5/2016  | Gascoine ............... | B65D 25/14 220/288 |

FOREIGN PATENT DOCUMENTS

KR          10-1776835 B        9/2017

\* cited by examiner

*Primary Examiner* — Shawn M Braden
(74) *Attorney, Agent, or Firm* — Lempia Summerfield Katz LLC

(57) ABSTRACT

A diesel exhaust fluid (DEF) cap assembly for a vehicle includes: a body having a first opening and a second opening arranged at an opposite side of the first opening, the second opening configured to be opened and closed; a flange portion protruding radially outward between the first opening and the second opening of the body, and having a plurality of through holes and a flange gasket configured to be sealably coupled to a mounting subject on which the flange portion is mounted; and a membrane member coupled to the flange portion, and configured to cover the plurality through holes and allow air flow.

13 Claims, 9 Drawing Sheets

FIG. 1 "PRIOR ART"
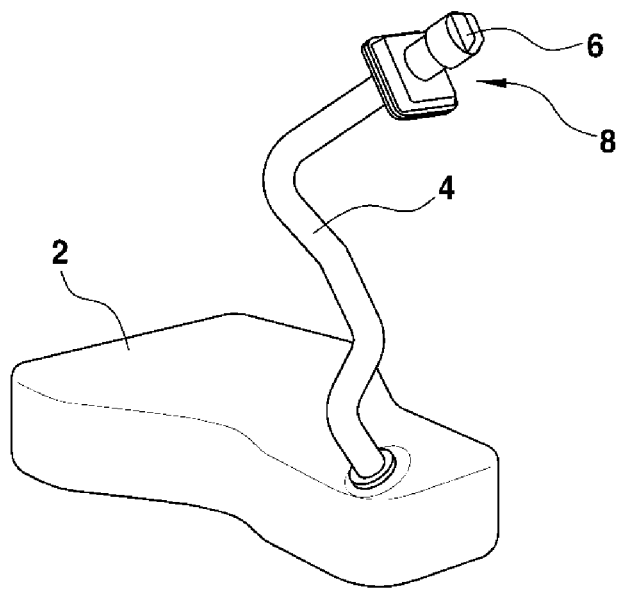

DIESEL EXHAUST FLUID CAP ASSEMBLY FOR VEHICLE AND DIESEL EXHAUST FLUID SUPPLY SYSTEM INCLUDING THE SAME

CROSS-REFERENCE TO RELATED APPLICATION

The present application claims priority to and the benefit of Korean Patent Application No. 10-2020-0097483, filed on Aug. 4, 2020, the entire contents of which are incorporated herein by reference.

FIELD

The present disclosure relates to a diesel exhaust fluid cap assembly for a vehicle and a diesel exhaust fluid supply system including the same.

BACKGROUND

The statements in this section merely provide background information related to the present disclosure and may not constitute prior art.

In general, diesel vehicles include exhaust gas after-treatment apparatuses to mitigate environmental pollution due to exhaust gas. Among exhaust gas after-treatment apparatuses, a selective catalyst reduction (SCR) apparatus is known to reduce not only nitrogen oxide ($NO_x$) but also carbon monoxide.

The SCR apparatus facilitates reaction between diesel exhaust fluid (DEF) including a urea solution and exhaust gas, thereby producing nitrogen and water. In order to operate the SCR apparatus, the DEF must be replenished every certain traveling distance, and thus a DEF supply system is provided in the vehicle.

FIG. 1 is a view schematically illustrating this DEF supply system. The DEF supply system includes a DEF tank 2, a DEF filler neck 4 and a DEF cap 6. In general, a DEF inlet 8 is generally provided inside a fuel door of a vehicle.

The DEF inlet 8 is coupled to the DEF filler neck 4. The DEF injected through the DEF inlet 8 is transferred to the DEF tank 2 through the DEF filler neck 4. Further, the DEF supply system includes a separate tube configured to supply the DEF to an exhaust system.

The DEF cap 6 is mounted on the DEF inlet 8 to inhibit foreign substances from entering the DEF tank 2 or to inhibit the DEF or a urea solution from leaking to the outside. However, positive pressure or negative pressure is generated when the urea solution is recovered or injected, and in order to eliminate such pressure, the DEF cap 6 includes a ventilation structure. The ventilation structure includes a membrane, and air flow between the DEF tank 2 and the outside is allowed only through the membrane. That is, the DEF cap 6 seals the DEF supply system and allows exchange of air with the outside through the membrane.

The DEF, i.e., the urea solution, may be injected through the same method as injection of fuel at a gas station or be injected using a bottle filled with the urea solution. In the latter, we have discovered that it is difficult to note the amount of the urea solution injected into the DEF tank 2, so the DEF may overflow out of the tank when the DEF is filled full. Also, we have discovered that an injection assisting device, such as a funnel, is desired to be installed every time DEF is refilled.

Particularly, the urea solution in a liquid state tends to be crystallized into a white solid when exposed to air. Accordingly, the vehicle may be stained with the white solid when the urea solution contacts the vehicle during injection.

The foregoing is intended merely to aid in the understanding of the background of the present disclosure, and is not intended to mean that the present disclosure falls within the purview of the related art that is already known to those skilled in the art.

SUMMARY OF THE DISCLOSURE

The present disclosure provides a diesel exhaust fluid (DEF) cap assembly for a vehicle which may improve user convenience when a urea solution is injected.

The present disclosure provides a diesel exhaust fluid cap (DEF) assembly for a vehicle in which a separate injection assistance device may not be used when a urea solution is injected through a bottle filled with the urea solution.

The present disclosure provides a diesel exhaust fluid (DEF) cap assembly for a vehicle which may inhibit contamination due to a urea solution around a DEF inlet when the urea solution is injected.

The present disclosure provides a diesel exhaust fluid (DEF) supply system having the above-described diesel exhaust fluid cap assembly for a vehicle.

In one form, the present disclosure provides a diesel exhaust fluid (DEF) cap assembly for a vehicle, comprising a body having a first opening and a second opening arranged at an opposite side of the first opening, the second opening configured to be opened and closed, a flange portion protruding radially outward from the body between the first opening and the second opening and having a plurality of through holes and a flange gasket configured to be sealably coupled to a mounting subject on which the flange portion is mounted, and a membrane member coupled to the flange portion to cover the through holes and allowing air flow.

In another form, the present disclosure provides a diesel exhaust fluid (DEF) supply system for a vehicle comprising a filler neck connected to a DEF tank and comprising a plurality of ribs protruding radially inward from an inner circumference of the filler neck and spaced apart from each other by a designated interval, and a DEF cap assembly detachably mounted on the filler neck, wherein the DEF cap assembly comprises a body, a flange portion configured to protrude radially outward from the body, hermetically mounted on an end of the filler neck, and comprising a plurality of through holes, and a membrane member coupled to the flange portion to cover through holes and allowing air flow.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a view schematically illustrating a diesel exhaust fluid (DEF) supply system provided in a diesel vehicle;

Figure 2A:
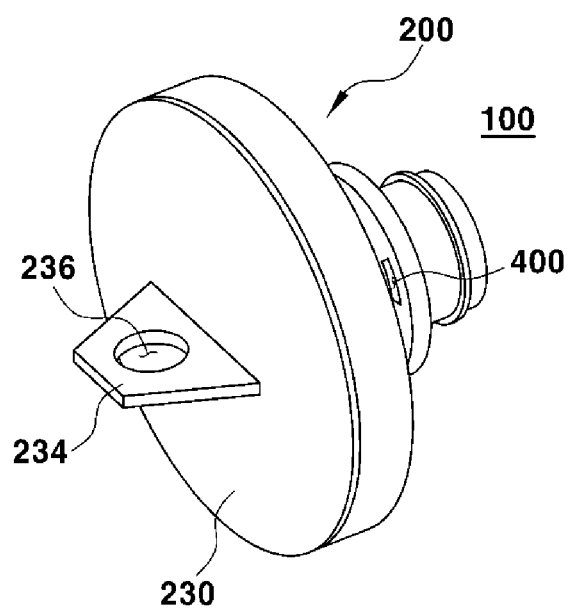
FIG. 2A is a perspective view of a DEF cap assembly for a vehicle according to one form of the present disclosure.

The drawings described herein are for illustration purposes only and are not intended to limit the scope of the present disclosure in any way.

DETAILED DESCRIPTION

Hereinafter, various forms of the present disclosure will be described in detail with reference to the accompanying drawings. Specific structures or functions described in the various forms of the present disclosure are merely for illustrative purposes. The concept of the present disclosure may be implemented in various forms, and it should be understood that they should not be construed as being limited to the forms described in the present specification, but include all of modifications, equivalents, or substitutes included in the spirit and scope of the present disclosure.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Like reference numerals denote like components throughout the specification. In the meantime, the terminology used herein is for the purpose of describing particular forms only and is not intended to be limiting. As used herein, the singular forms "a," "an," and "the" are intended to include the plural forms as well, unless the context clearly indicates otherwise. It will be further understood that the terms "comprise," "include," "have," etc., when used in this specification, specify the presence of stated components, steps, operations, and/or elements, but do not preclude the presence or addition of one or more other components, steps, operations, and/or elements thereof.

Hereinafter, the present disclosure will be described in detail with reference to the accompanying drawings.

Figure 2B:
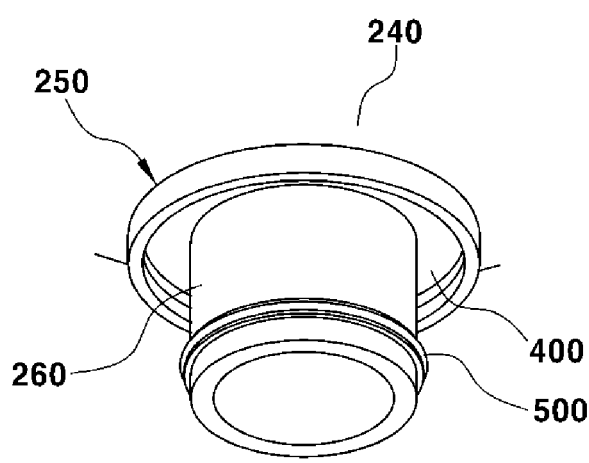
FIG. 2B is a perspective view of the DEF cap assembly for a vehicle of FIG. 2, as viewed from behind.
Figure 3:
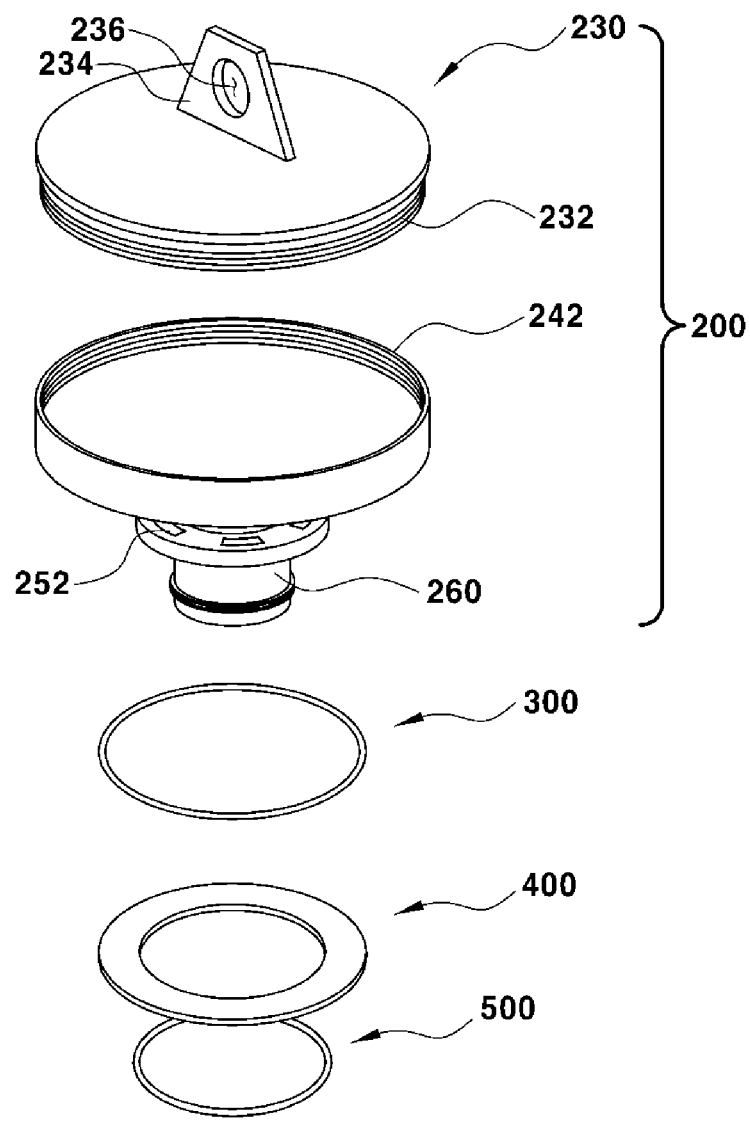
FIG. 3 is an exploded perspective view of the DEF cap assembly for a vehicle according to one form of the present disclosure.
Figure 4:
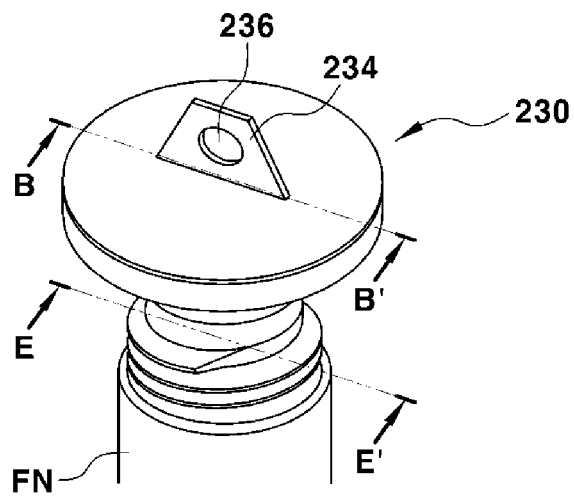
FIG. 4 is a perspective view of the DEF cap assembly for a vehicle according to one form of the present disclosure.
Figure 5:
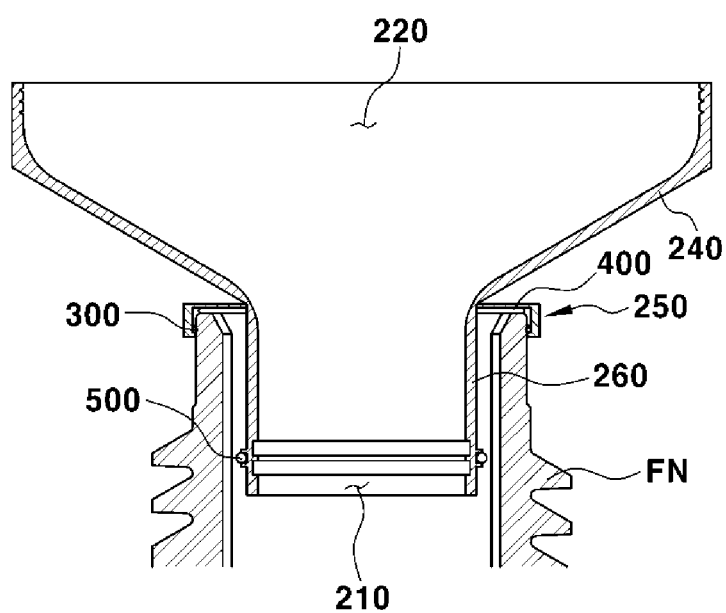
FIG. 5 is a longitudinal-sectional view taken along line B-B' of FIG. 4, illustrating a state in which a lid is removed.
Figure 6:
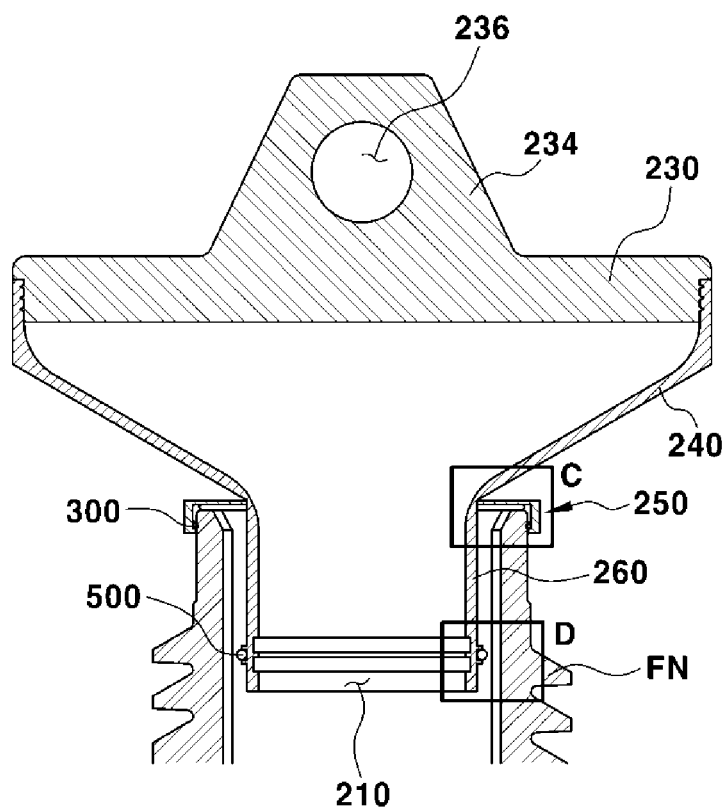
FIG. 6 is a longitudinal-sectional view taken along line B-B' of FIG. 4, illustrating a state in which the lid is mounted.

As shown in FIGS. 2A and 2B, a diesel exhaust fluid (DEF) cap assembly 100 for a vehicle according to one form of the present disclosure includes a body 200 and a membrane member 400.

Referring to FIGS. 3 to 6, the body 200 includes a first opening 210 and a second opening 220. The body 200 is hollow and the first opening 210 and the second opening 220 communicate with each other. The first opening 210 is formed at one end of the body 200, and the second opening 220 is formed at the other end of the body 200, opposite the first opening 210. The first opening 210 has a smaller diameter than the second opening 220.

The second opening 220 is configured to be opened and closed. When the DEF cap assembly 100 is in operation, the first opening 210 stays open at all times, and the second opening 220 may be either closed or opened. According to one form of the present disclosure, a lid 230 is coupled to the second opening 220 to open or close the second opening 220.

According to one form of the present disclosure, the lid 230 and the body 200 are separably coupled to each other through a thread engagement method. A male thread 232 is provided on the outer circumferential face of the lid 230. A female thread 242, which may be engaged with the male thread 232, is formed on the inner circumferential face of a portion of the body 200 close to the second opening 220 coupled to the lid 230.

According to one form of the present disclosure, the lid 230 includes a grip portion 234. The grip portion 234 protrudes from the surface of the lid 230 to a designated length. Further, a grip hole 236 is formed in the grip portion 234 so that a user may easily grip the grip portion 234 through the grip hole 236. According to one form of the present disclosure, the grip hole 236 pierces the lid 230 in a direction parallel to the surface of the lid 230.

The body 200 includes a tapered portion 240, a flange portion 250 and an insert portion 260. The tapered portion 240, the flange portion 250, and the insert portion 260 of the body 200 are formed sequentially in a direction from the second opening 220 to the first opening 210.

The tapered portion 240 tapers, i.e., a funnel shape, from the second opening 220 to the first opening 210. That is, the tapered portion 240 of the body 200 has a shape, the diameter of which gradually decreases from the second opening 220.

The flange portion 250 is formed between the first opening 210 and the second opening 220. The flange portion 250 may be formed at the end point of the tapered portion 240, i.e., at the portion of the body 200, the diameter of which does not decrease any further.

The flange portion 250 may protrude radially outward from the circumference of the body 200. According to one form of the present disclosure, a plurality of through holes 252 are arranged in the flange portion 250 and pierce in a direction from one side to the other side of the flange portion 250. Here, the direction from one side to the other side of the flange portion 250 is equal to the longitudinal direction of the body 200. The plurality of through holes 252 are disposed along the circumference of the flange portion 250.

That is, each through hole 252 with a certain size may be spaced apart from each other by a designated interval.

Figure 7:
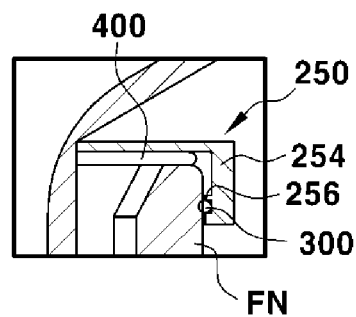
FIG. 7 is an enlarged view of a portion C of FIG. 6.

Referring to FIG. 7, a connection protrusion 254 may be formed at the end of the flange portion 250. The connection protrusion 254 extends vertically from the end of the flange portion 250 towards the first opening 210. According to one form of the present disclosure, a flange groove 256 is formed in the connection protrusion 254, and the flange groove 256 is provided in the inner surface of the connection protrusion 254. The flange groove 256 may be concavely recessed from the inner surface of the connection protrusion 254. The flange groove 256 may be formed between a pair of walls protruding from the inner surface of the connection protrusion 254, or the flange groove 256 may be depressed into the inner surface of the connection protrusion 254.

The insert portion 260 extends from the flange portion 250 towards the first opening 210. The insert portion 260 has approximately the same diameter as the end of the tapered portion 240. That is, the insert portion 260 has a diameter which is approximately the same as the minimum diameter of the tapered portion 240 and is smaller than the diameter of the flange portion 250.

Figure 8:
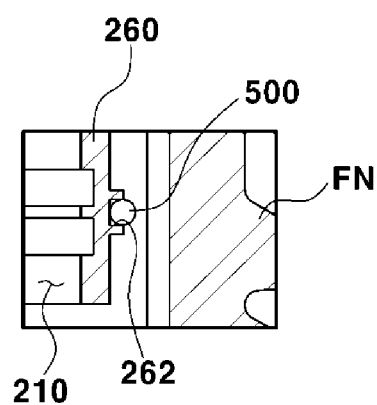
FIG. 8 is an enlarged view of a portion D of FIG. 6.

As shown in FIG. 8, an insert groove 262 is formed in the outer surface of the insert portion 260. The insert groove 262 is disposed along the circumference of the insert portion 260 close to the first opening 210. According to one form of the present disclosure, the insert groove 262 is depressed into the surface of the insert portion 260. According to another form of the present disclosure, a pair of walls protrude from the surface of the insert portion 260 and the insert groove 262 is formed between the walls.

A flange gasket 300 is mounted on the body 200. The flange gasket 300 may be mounted on the flange portion 250. In more detail, the flange gasket 300 may be placed in the flange groove 256 formed in the connection protrusion 254 of the flange portion 250. The flange gasket 300 serves to seal an interface with a mounting subject on which the flange portion 250 is mounted.

The DEF cap assembly 100 for a vehicle according to one form of the present disclosure further includes an insert gasket 500. The insert gasket 500 may be disposed in the insert groove 262. The insert gasket 500 serves to seal an interface with a contacting subject to which the insert portion 260 is to be adhered. According to the present disclosure, each of the flange gasket 300 and the insert gasket 50 may include a mechanical gasket, i.e., an O-ring.

The membrane member 400 is coupled to the flange portion 250 to cover the through holes 252 of the flange portion 250. The membrane member 400 may substantially be ring-shaped and adhered to the lower surface of the flange portion 250.

Hereinafter, exemplary operation of the DEF cap assembly 100 according to the present disclosure will be described.

Figure 9:
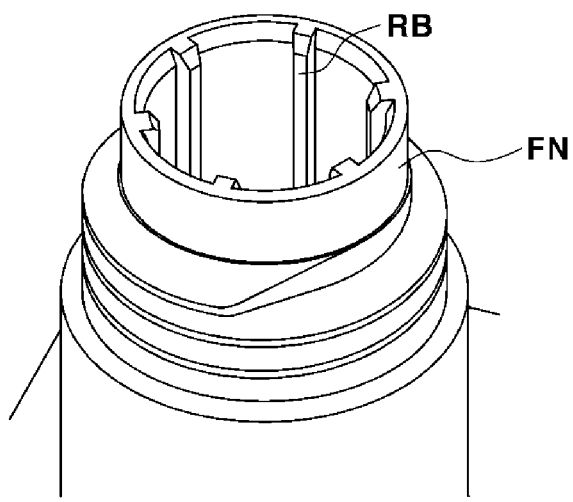
FIG. 9 is a perspective view illustrating a filler neck on which the DEF cap assembly for a vehicle according to one form of the present disclosure is mounted.

As shown in FIG. 9, the DEF cap assembly 100 for a vehicle is mounted on a filler neck FN provided on a vehicle to inject a urea solution thereinto. A plurality of ribs RB being spaced apart from each other by a designated interval protrude from the inner circumference of the filler neck FN. The ribs RB extends in the longitudinal direction of the filler neck FN on the inner circumference of the filler neck FN.

Figure 10:
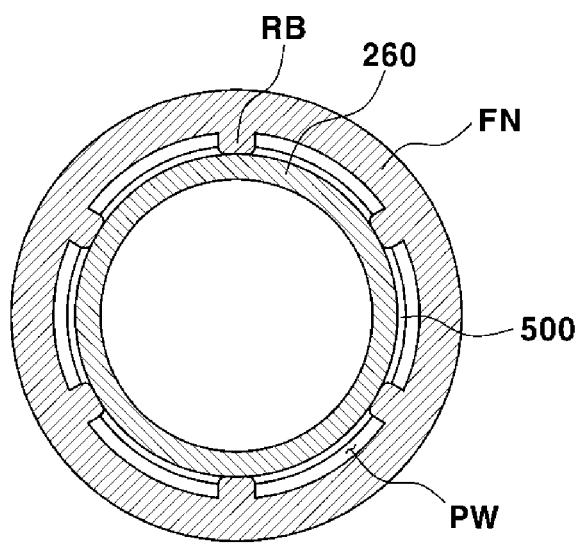
FIG. 10 is a cross-sectional view taken along line E-E' of FIG. 4.

As shown in FIG. 10, the insert portion 260 of the body 200 is inserted into the filler neck FN. The insert gasket 500 mounted on the insert portion 260 is pressed against ribs RB to fix the body 200. Passages PW for air flow are generated between the inner circumference of the filler neck FN and the insert portion 260.

The flange portion 250 of the body 200 is seated on the end of the filler neck FN, with the membrane member 400 interposed therebetween. The flange gasket 300 mounted in the flange groove 256 is mounted on the filler neck FN while sealing a space between the flange portion 250 and the filler neck FN (with reference to FIG. 7).

The flange gasket 300 seals the entire circumference of the filler neck FN, and air may flow in and out of the vehicle only through the membrane member 400.

That is, the flow of air from the outside of the vehicle to a DEF tank within the vehicle starts by inflow of air to the filler neck FN through the membrane member 400 mounted on the flange portion 250. The air flowing into the filler neck FN flows along the passages PW formed between the insert portion 260 and the ribs RB of the filler neck FN and continues to flow to the DEF tank along the filler neck FN. The flow of air from the DEF tank to the outside of the vehicle is performed in the reverse order, and thus a detailed description thereof will be omitted.

Figure 11:
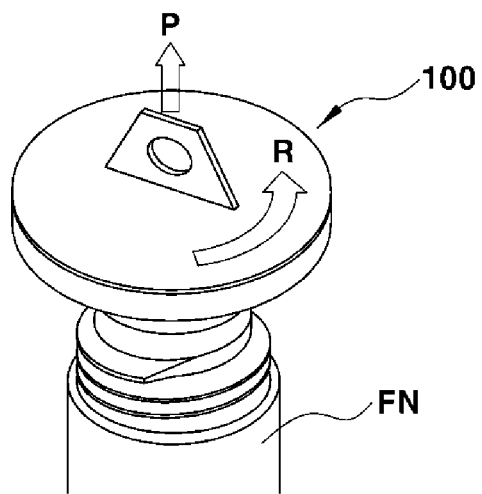
FIG. 11 is a view illustrating the operating method of the DEF cap assembly for a vehicle according to one form of the present disclosure.
Figure 12:
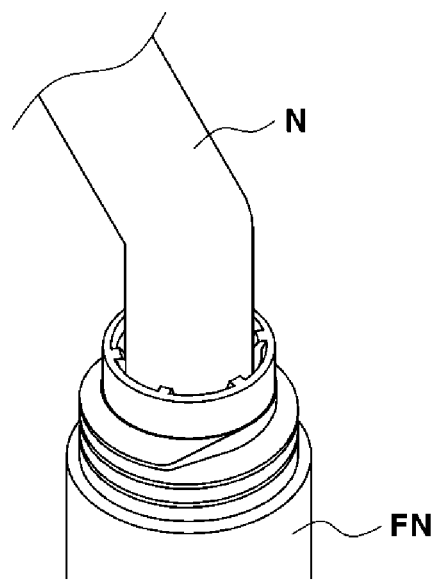
FIG. 12 is a view illustrating one example of operation of the DEF cap assembly for a vehicle according to one form of the present disclosure.
Figure 13:
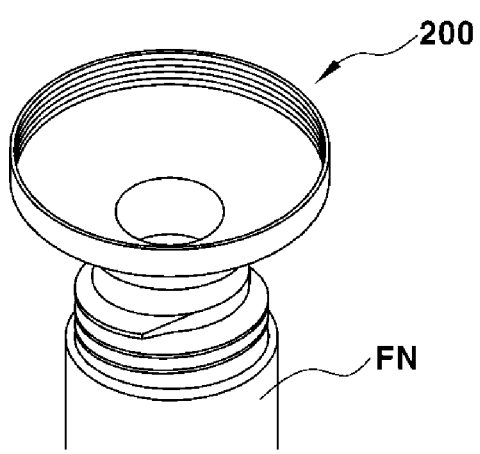
FIG. 13 is a view illustrating another example of operation of the DEF cap assembly for a vehicle according to one form of the present disclosure.

Referring to FIGS. 11 to 13, the DEF cap assembly 100 for a vehicle according to the present disclosure is configured to be detachably mounted on the filler neck FN. The DEF cap assembly 100 can be conveniently used both in case where an injection nozzle N is used in a gas station and in case a bottle filled with the DEF is used.

In case in which the DEF is injected into the DEF tank using the injection nozzle N in the gas station, when the grip portion 234 formed on the DEF cap assembly 100 is pulled (in the direction Pin FIG. 11), the DEF cap assembly 100 is detached from the filler neck FN. In this state in which the DEF cap assembly 100 is detached from the filler neck FN, as shown in FIG. 12, the DEF is injected into the DEF tank through the injection nozzle N. When injection of the DEF is completed, the DEF cap assembly 100 is again inserted into the filler neck FN.

On the other hand, when the DEF is injected using the bottle filled with the DEF, the lid 230 is rotated in the direction R in FIG. 11 and detached from the body 200. The lid 230 is coupled to the body 200 by the thread engagement and when the lid 230 is rotated, the lid 230 can be separated from the body 200 mounted on the filler neck FN (with reference to FIG. 13). Here, due to the taper of the tapered portion 240, any separate injection assistance device, such as a funnel or an injection hose, may not be used and convenience in use can be improved.

In the DEF cap assembly 100 according to the present disclosure, the tapered body 200 makes injection of the DEF convenient. During usage, injection speed of the DEF may be easily adjusted, and no injection assistance device, such as a funnel, is necessary.

Since the DEF cap assembly 100 according to the present disclosure is detachable, injection of the DEF becomes convenient both in case the injection nozzle N is used at the gas station or in case the filling bottle is used.

In addition, the DEF cap assembly 100 according to the present disclosure may be applied to the conventional filler neck FN without alternations or modifications of the conventional filler neck FN, thereby having compatibility and reducing costs.

As is apparent from the above description, the present disclosure provides a diesel exhaust fluid (DEF) cap assembly for a vehicle which may improve user convenience when a urea solution is injected.

Further, the DEF cap assembly for a vehicle according to the present disclosure does not require a separate injection assistance device when the urea solution is injected through a bottle filled with the urea solution.

In addition, the DEF cap assembly for a vehicle according to the present disclosure may inhibit contamination due to the urea solution around a DEF inlet when the urea solution is injected.

Furthermore, the present disclosure provides a DEF supply system including the above-described DEF assembly for a vehicle having increased convenience.

It should be understood that the present disclosure is not limited to the above described forms and the accompanying drawings, and various substitutions, modifications, and alterations can be devised by those skilled in the art without departing from the technical spirit of the present disclosure.

What is claimed is:

1. A diesel exhaust fluid (DEF) cap assembly for a vehicle, comprising:
    a body including: a first opening, and a second opening arranged at an opposite side of the first opening and configured to be opened and closed;
    a flange portion protruding radially outward from the body and disposed between the first opening and the second opening of the body, wherein the flange portion includes: a plurality of through holes, and a flange gasket configured to be sealably coupled to a mounting subject on which the flange portion is mounted; and
    a membrane member coupled to the flange portion, and configured to cover the plurality of through holes and allow an air flow.

2. The DEF cap assembly of claim 1, wherein the body further comprises a lid coupled to the second opening and configured to open and close the second opening.

3. The DEF cap assembly of claim 2, wherein a female thread is formed on an inner circumference of the body near the second opening, and a male thread configured to engage with the female thread is formed on an outer circumference of the lid.

4. The DEF cap assembly of claim 2, wherein the lid comprises a grip portion protruding from a surface of the lid, and the grip portion comprises a grip hole piercing the grip portion in a direction parallel to the surface of the lid.

5. The DEF cap assembly of claim 1, wherein the body further comprises a tapered portion having a tapered shape, and a diameter of the tapered portion gradually increases from the flange portion to the second opening.

6. The DEF cap assembly of claim 1, wherein through holes of the plurality of through holes are spaced apart from each other along a circumference of the flange portion and arranged at a designated interval.

7. The DEF cap assembly of claim 1, wherein the flange portion further comprises a connection protrusion extending vertically toward the first opening from the flange portion, wherein the connection protrusion includes a flange groove configured to receive the flange gasket.

8. The DEF cap assembly of claim 1, wherein the body further comprises an insert portion configured to extend from the flange portion toward the first opening and to have a diameter smaller than a diameter of the second opening.

9. The DEF cap assembly of claim 8, further comprising:
    an insert gasket mounted on an outer circumference of the insert portion,
    wherein an insert groove configured to receive the insert gasket is formed in the outer circumference of the insert portion.

10. A diesel exhaust fluid (DEF) supply system for a vehicle, the DEF supply system comprising:
    a filler neck connected to a DEF tank and including a plurality of ribs that protrudes radially inward from an inner circumference of the filler neck, wherein ribs of the plurality of ribs are spaced apart from each other by a designated interval; and
    a DEF cap assembly detachably mounted on the filler neck,
    wherein the DEF cap assembly comprises:
        a body;
        a flange portion configured to protrude radially outward from the body, hermetically mounted on an end of the filler neck, and including a plurality of through holes; and
        a membrane member coupled to the flange portion, and configured to cover the plurality of through holes and allow an air flow.

11. The DEF supply system of claim 10, wherein the body further comprises an insert portion inserted into the filler neck,
    wherein an insert gasket hermetically contacting the plurality of ribs is mounted on the insert portion.

12. The DEF supply system of claim 10, wherein the body further comprises a tapered portion disposed outside the filler neck and having a tapered shape.

13. The DEF supply system of claim 10, wherein a flange gasket hermetically coupled to an outer circumference of the filler neck is mounted on the flange portion.

* * * * *